(12) United States Patent
Kurtz et al.

(10) Patent No.: US 6,363,792 B1
(45) Date of Patent: Apr. 2, 2002

(54) ULTRA HIGH TEMPERATURE TRANSDUCER STRUCTURE

(75) Inventors: Anthony D. Kurtz, Teaneck; Scott J. Goodman, Wayne; Robert Gardner, Westwood, all of NJ (US)

(73) Assignee: Kulite Semiconductor Products, Inc.

(*) Notice: Subject to any disclaimer, the term of this patent is extended or adjusted under 35 U.S.C. 154(b) by 0 days.

(21) Appl. No.: 09/288,905

(22) Filed: Apr. 9, 1999

Related U.S. Application Data

(60) Provisional application No. 60/118,084, filed on Jan. 29, 1999.

(51) Int. Cl.[7] .............................. G01L 9/00; G01L 19/04
(52) U.S. Cl. .......................................... 73/753; 73/708
(58) Field of Search ........................ 73/753, 727, 721, 73/725, 715, 723, 717, 708; 29/25.35; 338/42

(56) References Cited

U.S. PATENT DOCUMENTS 4,994,781 A * 2/1991 Sahagen ..................... 338/47
5,286,671 A   2/1994 Kurtz et al.

* cited by examiner

Primary Examiner—William Oen
Assistant Examiner—Abdullahi Aw-Musse
(74) Attorney, Agent, or Firm—Arthur L. Plevy; Duane Morris LLP

(57) ABSTRACT

A hermetically sealed high temperature pressure transducer assembly including: a sensor wafer that includes a plurality of sensor structures and contact areas selectively interconnected and formed on a surface thereof is provided. A first header assembly coupled to the sensor wafer includes a plurality of pins, each of which are electrically coupled to an associated contact area. A second header assembly is coupled to the first assembly and to a sleeve, and includes a plurality of tubes into each of which one of the plurality of pins is positioned. A temperature insulated cable is partially positioned within the sleeve and includes a plurality of wires coupled to the pins. A third header apparatus is coupled to the sleeve and includes a plurality of closed-ended tubes for serving as leads, where each one of the plurality of wires is partially positioned in and coupled to a respective closed-end tube.

10 Claims, 17 Drawing Sheets

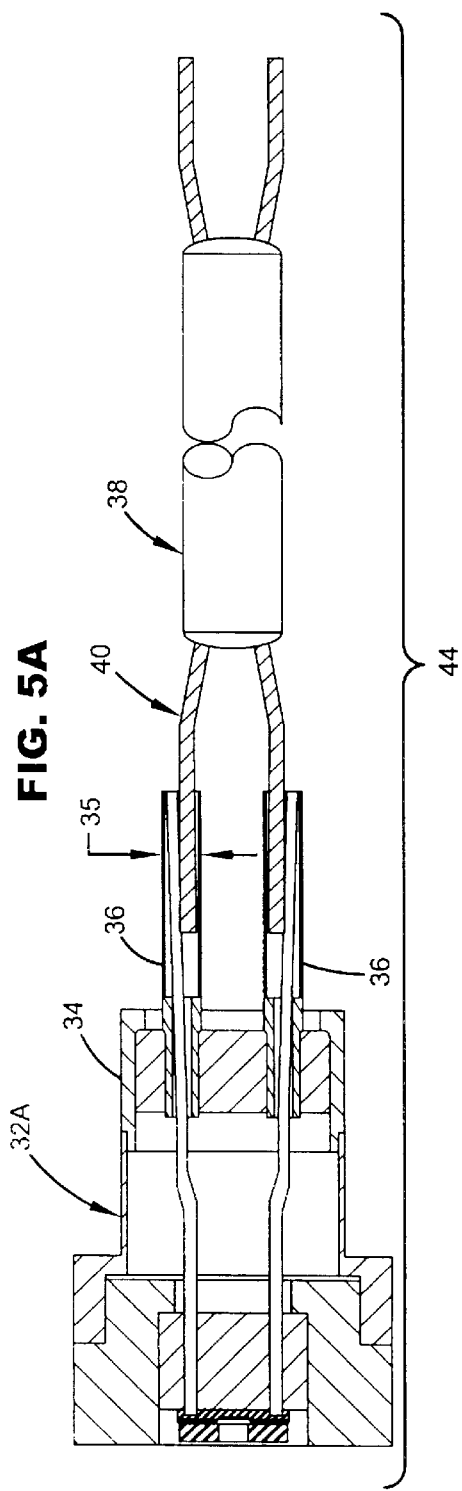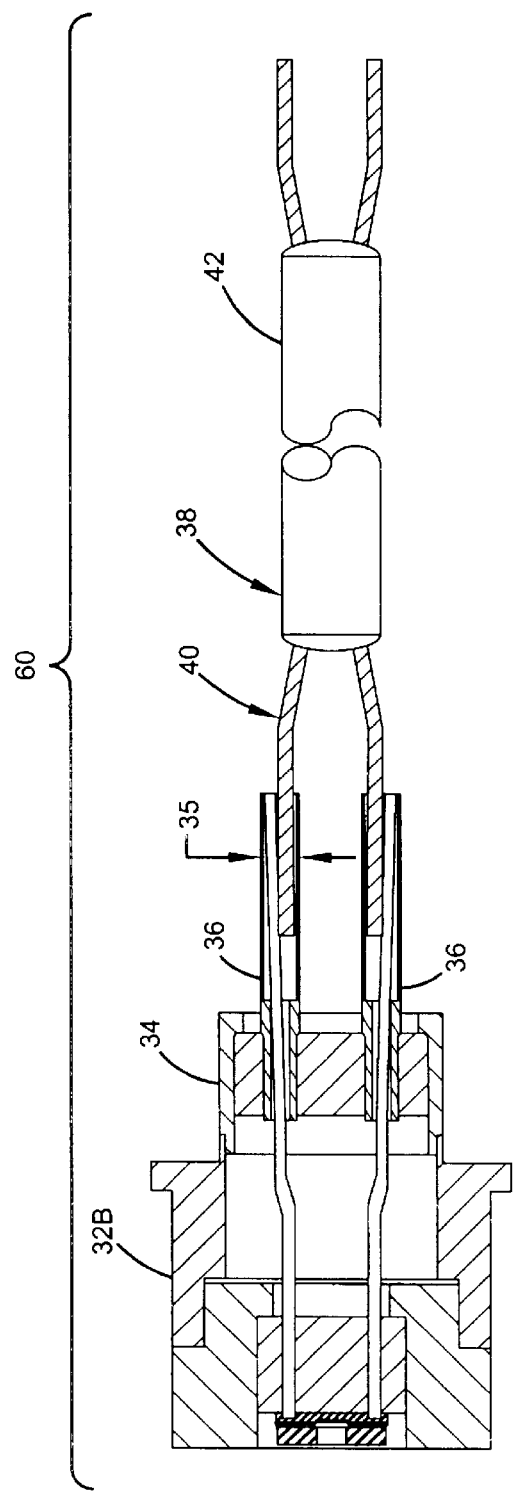
FIG. 5A
FIG. 5B

ULTRA HIGH TEMPERATURE TRANSDUCER STRUCTURE

RELATED APPLICATION

This application is related to U.S. Provisional Patent Application Serial No. 60/118,084, entitled "Ultra High Temperature Transducer Structure", filed Jan. 29, 1999 from which priority is hereby claimed, and which is assigned to the assignee hereof.

FIELD OF INVENTION

The present invention relates to high temperature pressure transducers and more particularly to a hermetically sealed high temperature pressure transducer

BACKGROUND OF INVENTION

In recent years the need for semiconductor pressure transducers that can be used in applications that require operation in harsh environments that are corrosive, oxidizing, high vibration and involve high temperatures has increased. Accordingly, not only must the stress-sensing network of these transducers be protected from these harsh environmental conditions in some way to enable the transducer to remain operational at high temperature over extended periods of time, but the entire transducer structure, including: electrical contacts, lead-outs, interconnects and external wiring must also be protected. A method for fabricating a sensor network which is dialectically isolated from the flexing sensor diaphragm can be seen in commonly assigned U.S. Pat. No. 5,286,671, entitled "Diffusion Enhanced Fusion Bonding", the entire disclosure of which is incorporated by reference herein. Therein, the degenerate P+ sensor network remains electrically isolated from the deflecting diaphragm. A method for fabricating such a dialectically isolated sensor structure wherein only the back side of the transducer is exposed to ambient pressure while also hermetically sealing the front side of the transducer which contains the stress-sensing network to a cover member can be seen in commonly assigned, copending United States patent application Ser. No. 09/160,976, the entire disclosure of which is also incorporated by reference herein.

Therein, a semiconductor sensor device comprising a semiconductor diaphragm member having a front surface coated with an oxide layer; P+ sensor elements fusion bonded to the oxide layer at a relatively central area of the diaphragm; P+ finger elements fusion bonded to the oxide layer extending from the sensors to an outer contact location of the diaphragm for each finger; and a rim of P+ material fusion bonded to the oxide layer and surrounding the sensors and the fingers is disclosed. A first glass wafer member is electrostatically bonded at the front surface to the fingers and rim to hermetically seal the sensors and fingers of the diaphragm member. The first glass wafer includes a depression above the sensors and a plurality of apertures, where each aperture is associated with a separate finger at the contact location and is smaller than the associated finger lining up with the contact location. Further, each contact location can be accessed via the associated aperture in the first glass wafer.

The apertures in the first glass wafer are filled with a glass-metal frit such as gold or platinum palladium silver, and a second glass wafer or header is sealingly coupled to a top surface of the first glass wafer. The second glass wafer or header has a plurality of apertures aligned with the plurality of apertures in the first wafer and contains a group of hermetically sealed pins slightly protruding from its surface for electrically coupling by means of the glass frit to the various contact locations. In this way it is possible to produce a sensor assembly wherein only the front nonactive side of the structure needs to be exposed to the pressure medium, where there is no need for small ball bonded gold leads to the sensor network, and where the entire sensor network and contact area is hermetically sealed and thus not exposed to the pressure media. Such a sensor is illustrated in FIG. 1.

However, the hermetically sealed sensor bonded to a header is only the starting point for an entire transducer assembly. For instance, most transducers must be affixed to a mounting surface for exposure to the pressure media, frequently by means of a threaded port. Thus, the sensor-header assembly must be joined to the port. Additionally, the header pins must be electrically connected to a high temperature cable assembly without the use of solder joints, which could fail at these high temperatures. The high temperature cable assembly must also contain material which will provide electrical isolation between individual leads, while the interconnects between the header and the cable as well as the cable itself must be strong enough to withstand mechanical stress imparted thereon. It is an object of the present invention to provide a structure that overcomes these problems.

SUMMARY OF THE INVENTION

A high temperature pressure transducer suitable for mounting on a jet engine or airframe may be made by the following steps:

A reverse mountable absolute Silicon-on-Oxide sensor is fabricated using the processes described in U.S. patent Ser. No. 09/041,228.

The apertures in the glass structures are filled with a glass-metal frit and the sensor is mounted with a pyroceram type glass to a header containing small protruding pins of about 0.010" in diameter which align with the apertures In the sensor structure. The sensor header assembly is then heated causing the various glasses to solidify.

A sleeve is welded to the first header. The second header is used containing a group of tubes which align with the pins of the first header, with the inner diameter of the tube big enough to accept the pin from the first header as well as another lead which will enter the tube from the other direction.

The pins from the first header are inserted through the tubes of the second header and the second header is welded to the sleeve.

A mineral insulated cable containing nickel wires of diameter about 0.020" is used to interconnect to the pins from the first header. The cable consists of a steel tube of 0.093" in diameter filled with Mg O which acts as a high temperature insulator and serves to insulate the individual wires from each other and the outer steel tube.

Both the ends of the mineral insulated cable are first sealed with glass but the ends of leads from the cable are left protruding The exposed leads from one end of the cable are inserted into the tubes of the second header. The tubes are then crimped and welded to insure that the header leads (pins) maintain electrical contact with the leads in the mineral insulated cable.

The header-insulated cable assembly is then inserted into a port and welded to the port. At the end of the port there is another tubulation which is also crimped to keep the mineral insulated cable in place. Typically, the mineral insulated cable will be 2 feet in length. This was the finishing stage for most devices using high temperature mineral insulated cable but it is clear that there are certain disadvantages to the transducer in this state. For instance, the interconnect portion between the leads of the first header and the leads of the mineral insulated cable are exposed to a high temperature oxidizing atmosphere. In addition, the only means of securing the cable to the header are the crimps between the header wires and the cable wires and the crimp on the cable at the pressure port. This method of construction leads to a number of unanticipated advantages. Although, the cover sleeve was added to strengthen the mineral insulated cable, the weld of the sleeve to the back of the port and the use of a third header makes all of the internal interconnects hermetically sealed from any atmospheric contamination or oxidation. Every single internal metalized surface such as metal-to-silicon, metal-glass frit, header pins to header tubes, header pins to mineral insulated cable wires and even the mineral insulation itself is hermetically seated from the atmosphere. In addition the welding of the sleeve to the port together with the addition of the third header greatly increases the structural integrity of the entire electrical interconnect system and reduces the chances of any damage in severe environments.

BRIEF DESCRIPTION OF THE FIGURES

FIG. 5A illustrates a mineral insulated cable main header assembly according to the present invention.

FIG. 5B illustrates a mineral insulated cable reference header assembly according to the present invention.

DETAILED DESCRIPTION OF THE INVENTION

Figure 1:
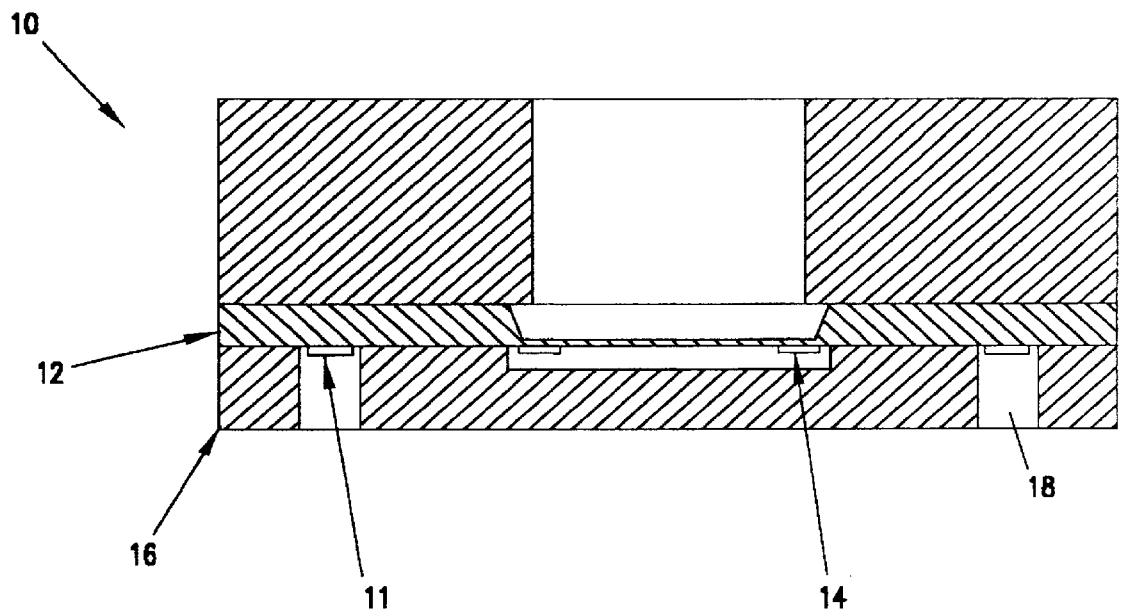
FIG. 1 illustrates a sensor utilized according to the present invention.

Referring now to the numerous figures, wherein like references refer to like elements of the invention, FIG. 1 illustrates a sensor 10 utilized according to the present invention.

The sensor 10 preferably includes a semiconductor diaphragm member 12 having a bottom surface coated with an oxide layer and P+ sensor elements 14 fusion bonded to the oxide layer at a relatively central area of the diaphragm member 12. A first glass wafer 16 is preferably electrostatically bonded at the bottom surface to the fingers and rim to hermetically seal the sensors and fingers of the diaphragm member 12. The first glass wafer 16 includes a depression above the sensors 14 and has a plurality of apertures 18 each associated with a separate finger at the contact location 11 and each being smaller than the associated finger lining up with the contact location 11 wherein each contact location 11 can be accessed via the associated aperture 18 in the first glass wafer member 16.

Figure 2:
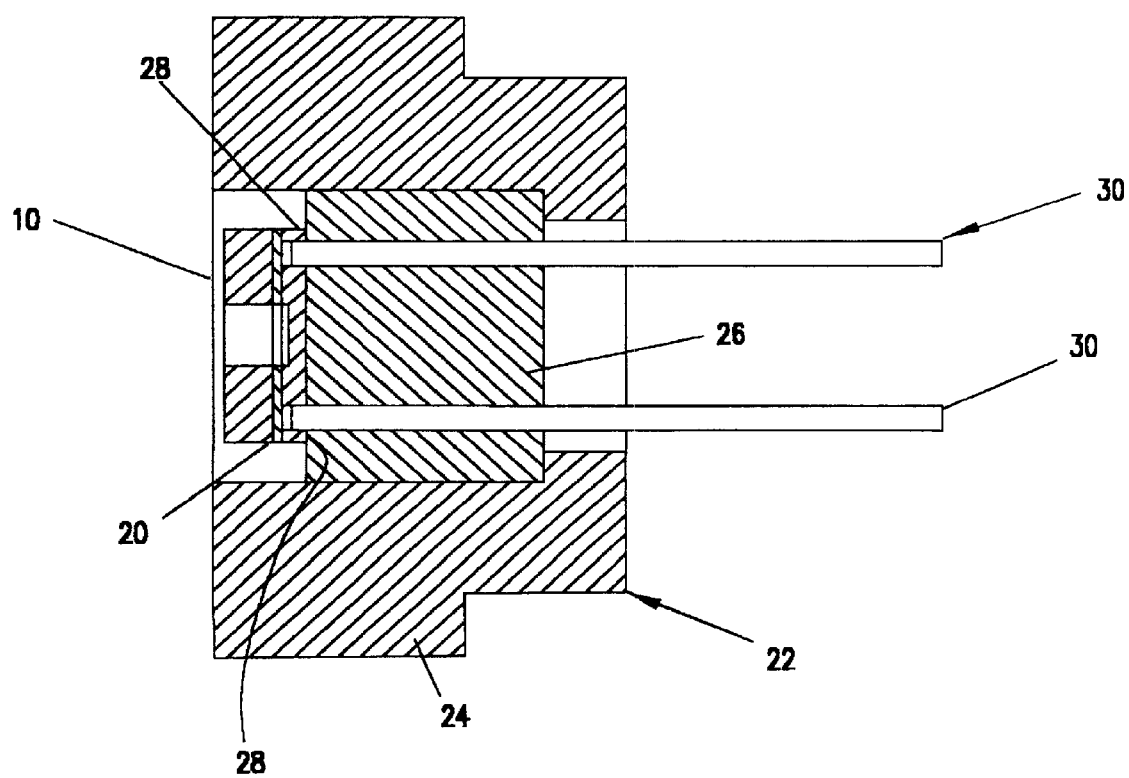
FIG. 2 illustrates a sensor header assembly according to the present invention.

Referring now also to FIG. 2, the apertures 18 are preferably filled with a glass-metal frit 20 such as gold or platinum palladium silver, and a first header 22 is sealingly coupled to a top surface of the first glass wafer. The first header 22 preferably includes a metallic portion 24 formed of Kovar for example (an alloy having a nominal composition of 29% nickel, 17% cobalt, 53% iron) and a glass portion 26 preferably formed of a pyrex glass. The first header 22 has a plurality of apertures 28 aligned with the plurality of apertures 18 in the first wafer and contains a group of hermetically sealed pins 30 having a diameter of preferably about 0.010" (four for example) slightly protruding from its surface for electrically coupling by means of the glass frits 20 to the various contact locations (preferably gold plated Kovar). In this way it is possible to produce a sensor assembly wherein only the non-active side of the structure needs to be exposed to the pressure medium, where there is no need for small ball bonded gold leads to the sensor network, while the entire sensor network and contact area is hermetically sealed and thus not exposed to the pressure media. The sensor header assembly is heated causing the various glasses to solidify.

Figure 3A:
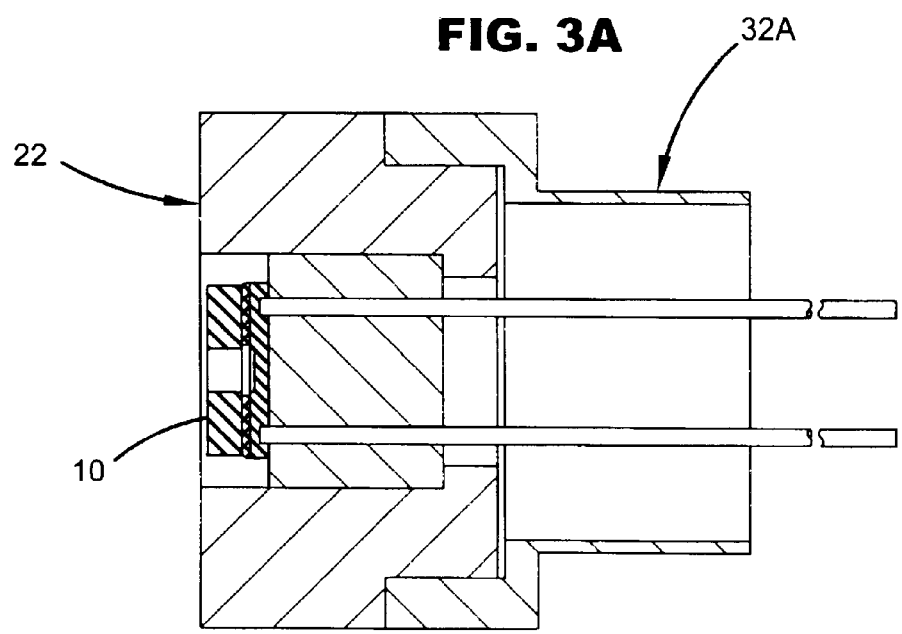
FIG. 3A illustrates a main header sleeve assembly according to the present invention.
Figure 3B:
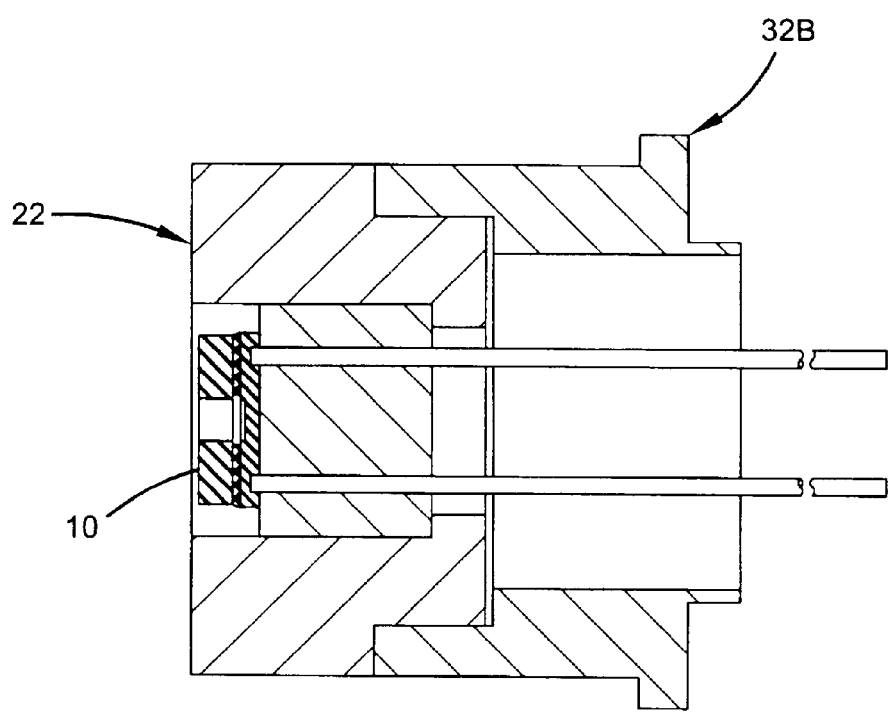
FIG. 3B illustrates a reference header sleeve assembly according to the present invention.

Referring now also to FIGS. 3A and 3B, a sleeve (32A in the case of the main sensor header and 32B in the case of a reference sensor header) is welded to the first header 22. As will become evident, the difference between the shapes of sleeves 32A and 32B relates to how they are preferably to be mounted to form a differential pressure transducer according to the present invention.

Figure 4A:
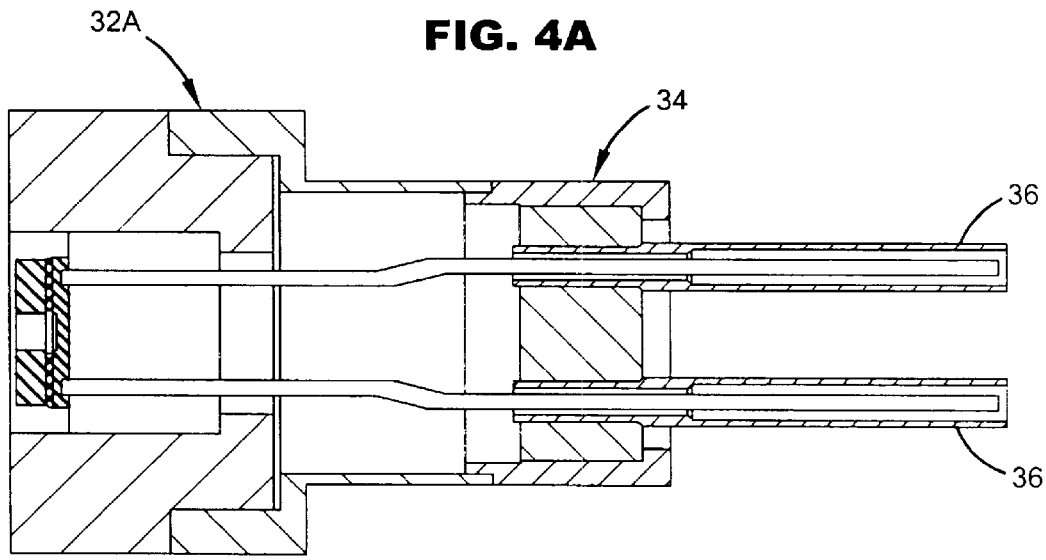
FIG. 4A illustrates a second header and main sleeve assembly according to the present invention.
Figure 4B:
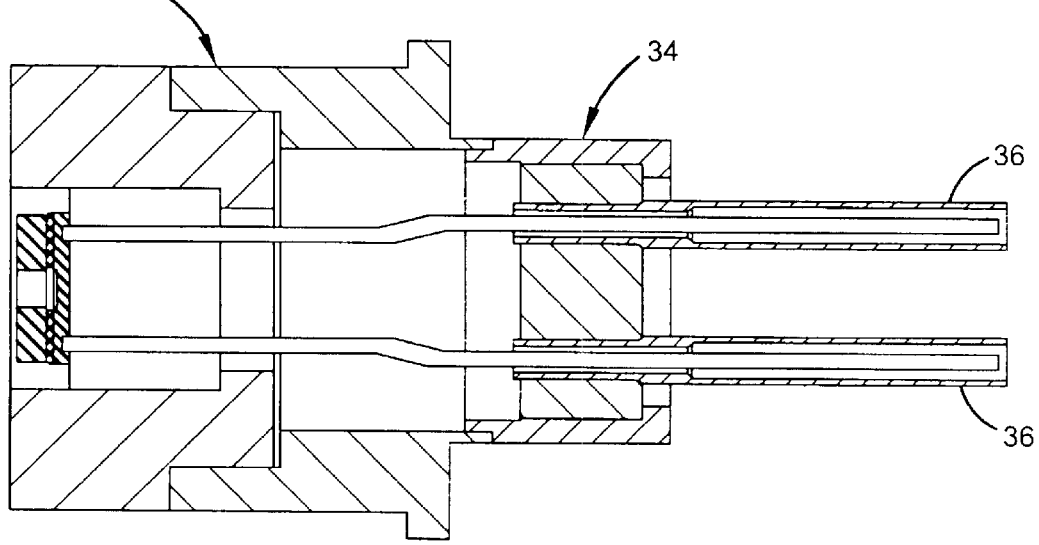
FIG. 4B illustrates a second header and reference sleeve assembly according to the present invention.

Referring now also to FIGS. 4A and 4B, a second header 34 is used containing a group of tubes 36 which align with the pins 30 of the first header 22, each with an inner diameter large enough to accept a pin 30 from the first header 22 as well as another lead which will enter the tube from the other direction. The pins 30 from the first header 22 are inserted into the tubes 36 of the second header 34 and the second header 34 is preferably welded to the sleeve (32A in the case of FIG. 4A, and 32B in the case of FIG. 4B).

As will be evident to one possessing ordinary skill in the art, the sleeves 32A and 32B are preferably configured such that identical first headers 22 and identical second header 34 can be welded thereto.

Referring now also to FIGS. 5A and 5B, a mineral insulated cable 38 containing nickel wires 40 preferably having a diameter of approximately 0.020" is used to interconnect to the pins 30 of the first header 22 within the tubes 36. The cable 38 further includes a steel tube 42 preferably having a diameter of approximately 0.093" filled with magnesium oxide (MgO) which serves as a high temperature insulator to insulate the individual wires 40 from each other and from the outer steel tube 42.

Both ends of the mineral insulated cable 38 are preferably sealed with glass and with the ends, or leads of wires 40 from the cable 38 are left protruding. The exposed ends of the wires 40 are inserted into the tubes 36 of the second header 34. The tubes 36 are then crimped and welded (preferably at a position 35) to insure that the header leads (pins 30) maintain electrical contact with the wire 40 leads of the mineral insulated cable. This sealing of the ends of the cable 38 serves to further protect the sensor 10 and other elements hereto discussed.

Figure 6:
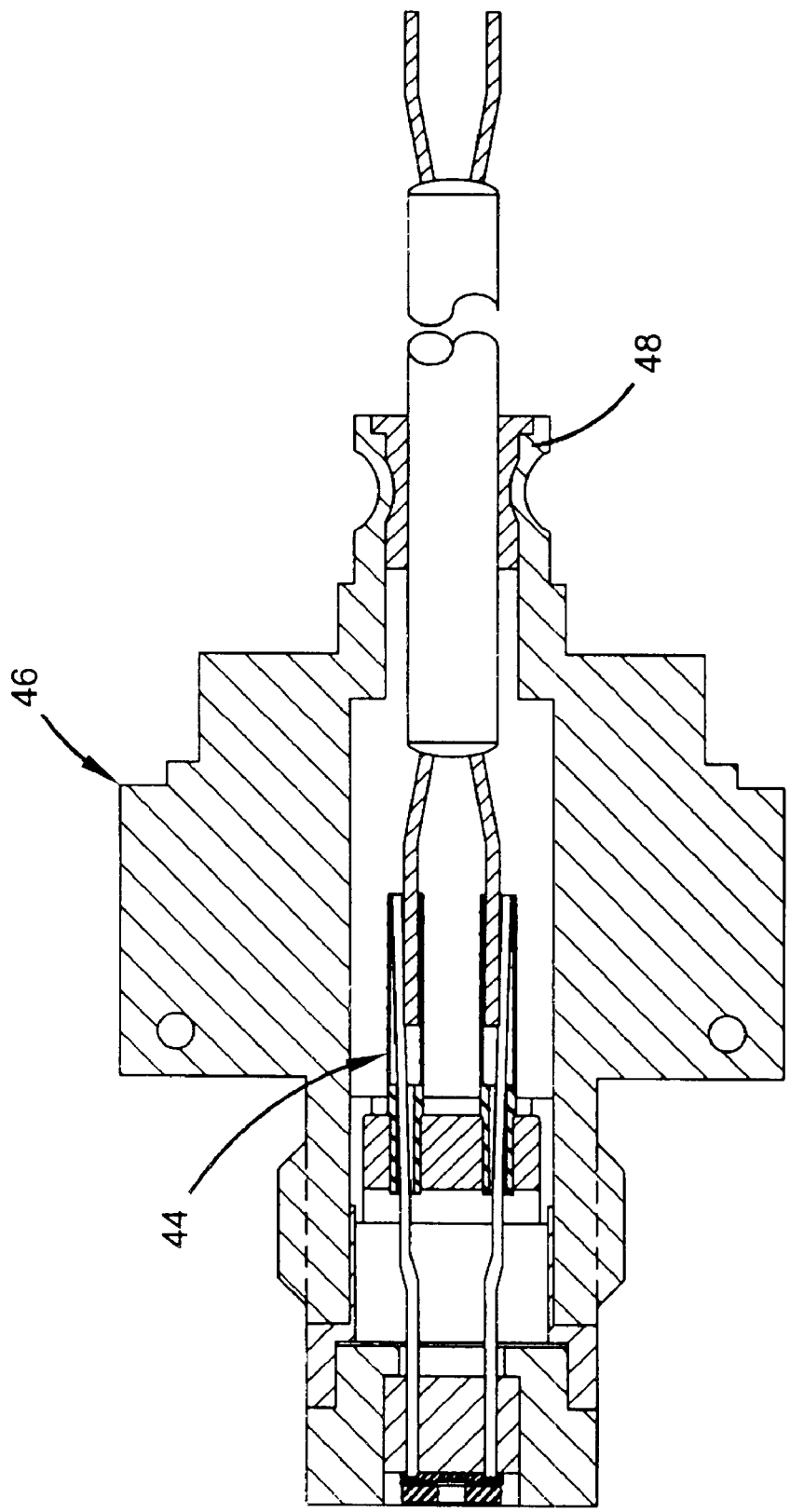
FIG. 6 illustrates a single header insulated cable to port assembly according to the present invention.

Referring now to FIG. 6, if an absolute sensor is to be made, the header-insulated cable assembly 44 (collectively elements 10, 22, 32A, 34 and 40) is then inserted into a port 46 and welded thereto. At the end of the port there is another tabulation 48 which is also crimped to further secure the mineral insulated cable 38 in place. In typical applications, the mineral insulated cable 38 will be up to 2 feet in length.

Like other more typical devices which use high temperature mineral insulated cable, one end can be left unsealed, however it is clear that there are certain disadvantages to a transducer in this state. For instance, the interconnect portion between the leads of the first header and the leads of the mineral insulated cable are exposed to a high temperature oxidizing atmosphere. Additionally, the only means of securing the cable to the header are the crimps between the header wires and the cable wires and the crimp on the cable at the pressure port exit. Thus, any excessive stress on the cable will serve to break these connections and cause an open circuit condition. Further, large stresses on the cable can also break down the internal dielectric causing loss of isolation. Finally, the only means for preventing moisture egress in the mineral insulated cable is the glass seal over each end thereof.

Figure 7:
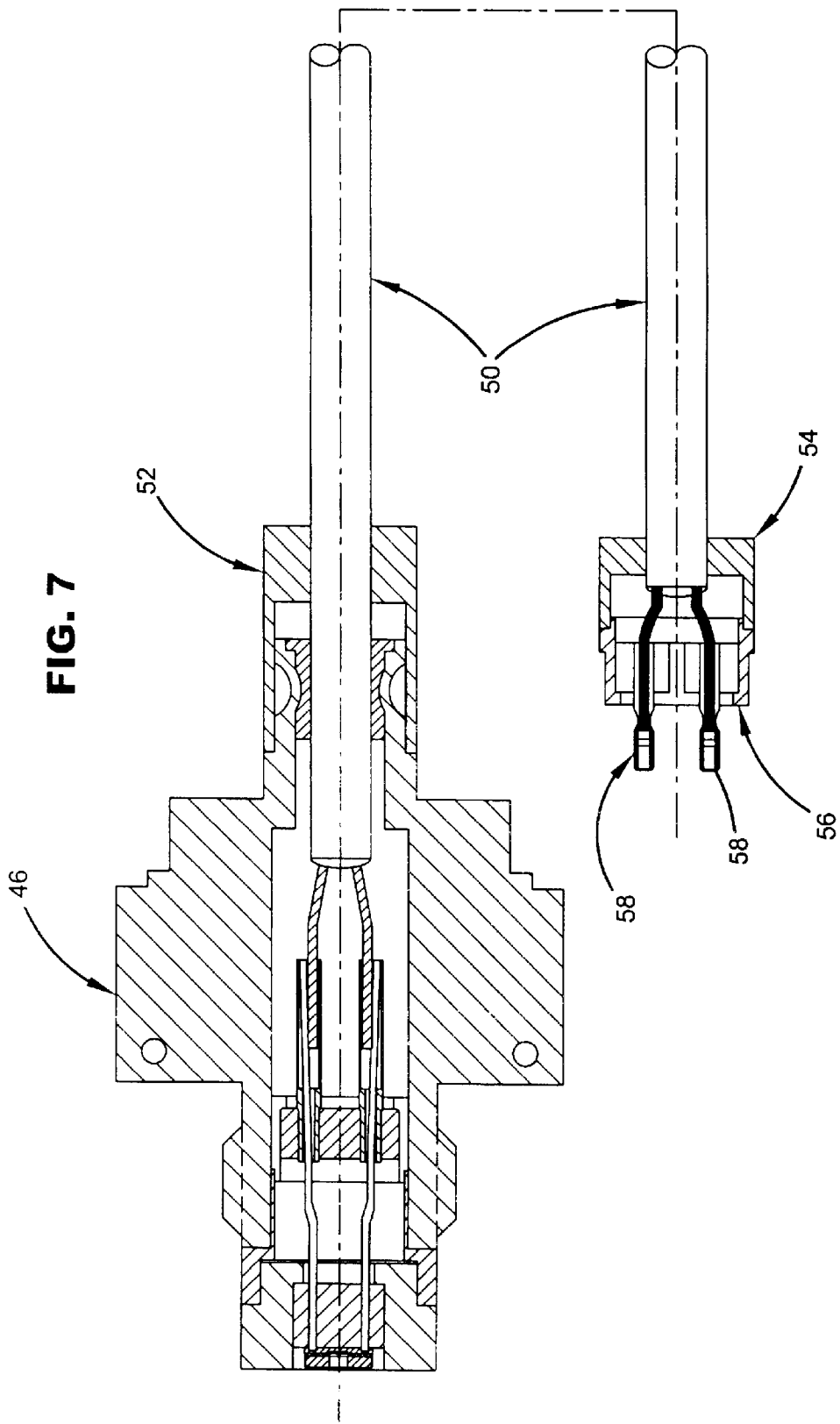
FIG. 7 illustrates a single header final absolute pressure transducer assembly according to the present invention.

Accordingly, in a preferred embodiment of the invention, and referring now also to FIG. 7, an additional thin-walled sleeve 50 having an internal diameter scarcely greater than the external diameter of the mineral insulated cable 38 is brazed, or otherwise fastened, to, at each end, cylindrical portions 52, 54 having weld preparations. This sleeve 50 and cylindrical portion combination is installed over the insulated cable and one end is welded to the back of the port assembly 46 (52 to 46). A third header 56, which includes closed-ended tubes 58, is installed over the back end of the mineral insulated cable 38 such that the wires 40 within the cable 38 are inserted into the closed-ended tubes 58. These tubes 58 are then preferably crimped and spot-welded thus securing the wires 38 therein and the third header 56 is welded to the sleeve 50 and cylindrical portion combination (56 to 54).

This preferred method of construction leads to a number of unanticipated advantages. Although, the cover sleeve 50 was added to strengthen the mineral insulated cable, the weld of the sleeve 50 to the back of the port 46 and the use of a third header 56 makes all of the internal interconnects hermetically sealed from any atmospheric contamination or oxidation. Every single internal metalized surface such as metal-to-silicon, metal-glass frit, header pins to header tubes, header pins to mineral insulated cable wires and even the mineral insulation itself is hermetically seated from the atmosphere. Additionally, the welding of the sleeve 50 to the port 46 together with the addition of the third header 56 greatly increases the structural integrity of the entire electrical interconnect system and reduces the chances of any damage in severe environments.

Figure 8:
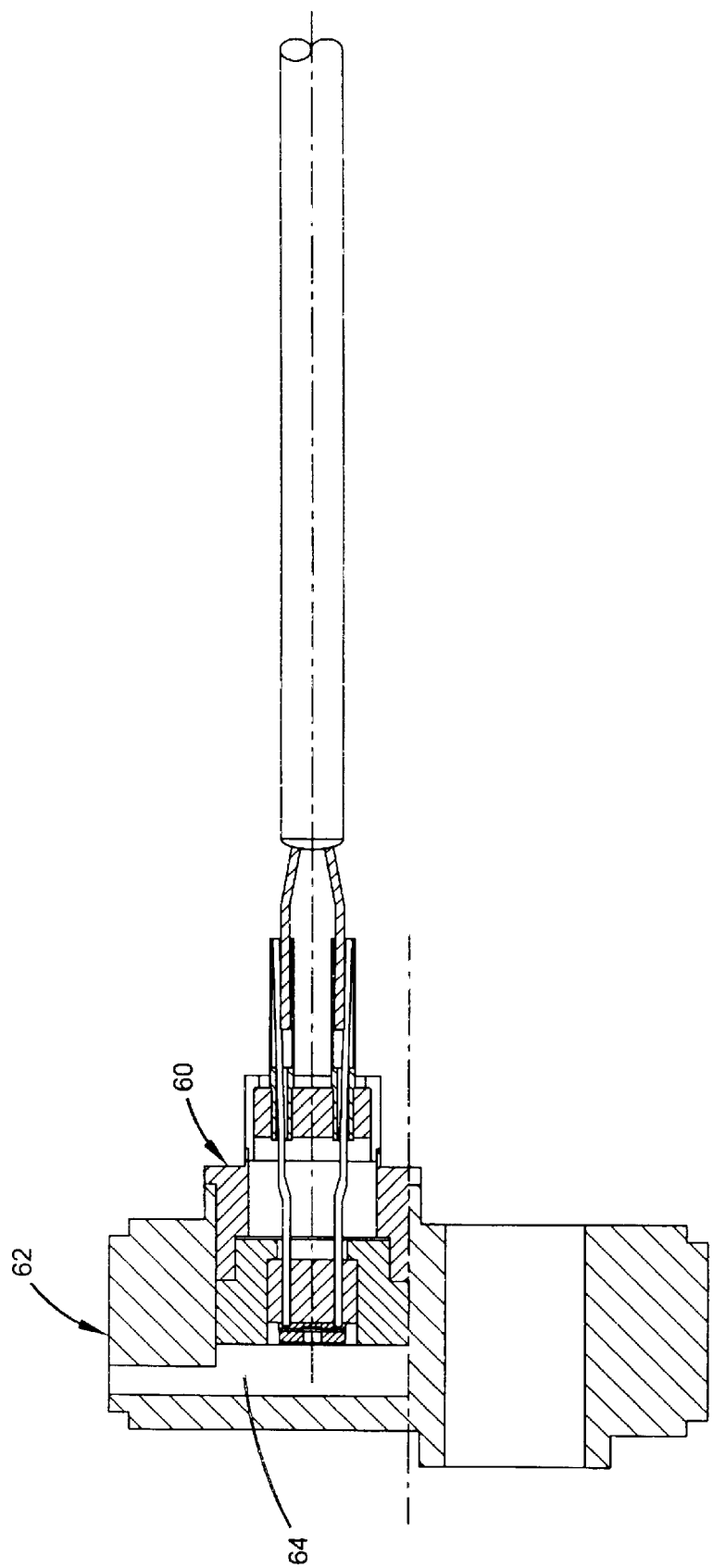
FIG. 8 illustrates a mineral insulated cable reference header assembly and vented block housing according to the present invention.

Referring now to FIG. 8, if a gauge or differential sensor is to be made, the reference header-insulated cable assembly 60 (collectively elements 10, 22, 32B, 34 and 40) is then inserted into a housing 62 and welded thereto. The housing can be configured such that the non-active, front side of the sensor 10 is positioned within a chamber 64 vented to a reference pressure, i.e. ambient pressure.

Figure 9:
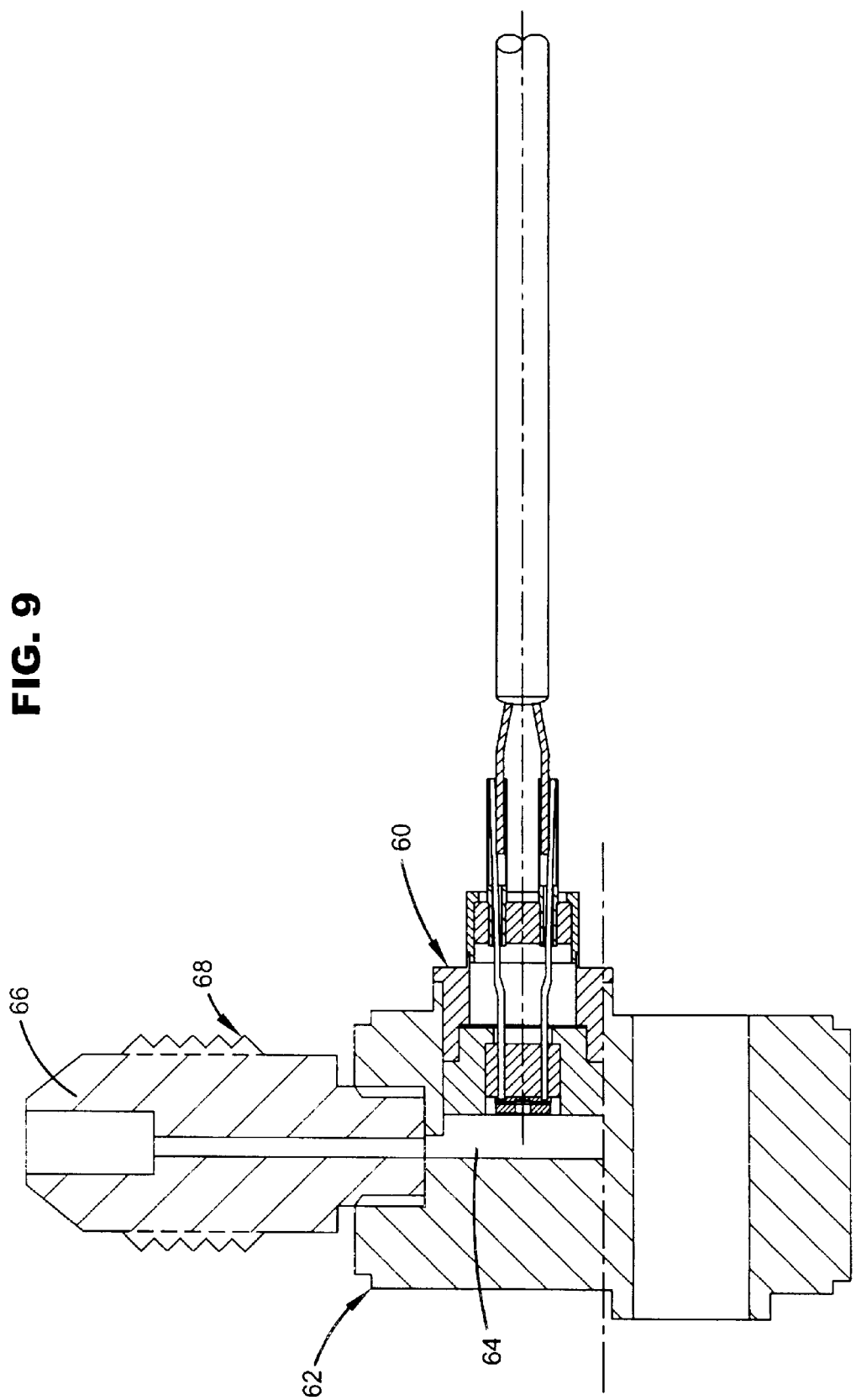
FIG. 9 illustrates a mineral insulated cable reference header assembly and back housing including a reference port according to the present invention.

Referring now also to FIG. 9, the chamber 64 of housing 62 may also be communicably coupled to any reference pressure utilizing a reference port 66, which for example may preferably include threads 68 for enabling coupling further of the port 66.

Figure 10:
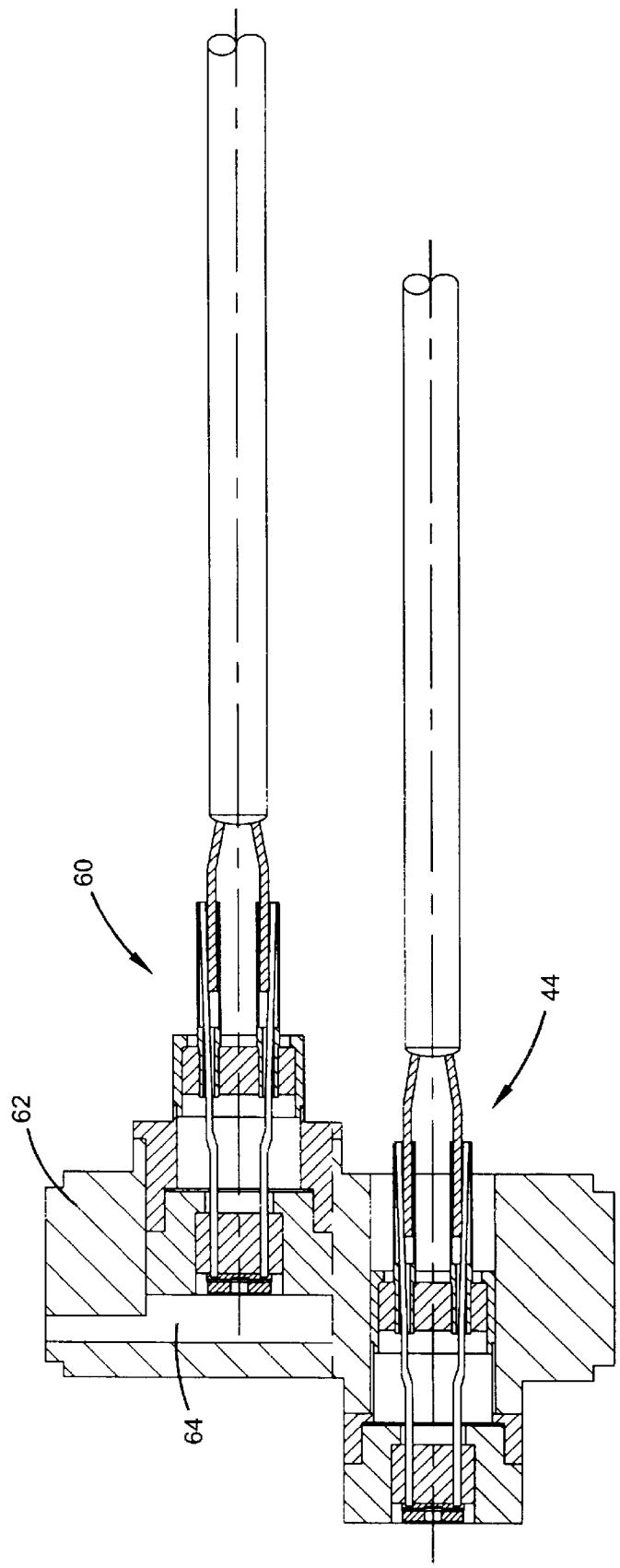
FIG. 10 illustrates the assembly of FIG. 8A further including the main header assembly of FIG. 5A.

Referring now also to FIG. 10, the main mineral insulated cable assembly 44 is then installed into the housing 62 and welded thereto such that the non-active, front side of the sensor 10 is exposed to the media to be measured. Manufacture in this way is advantageous for welding of the assembly 44 to the housing 62 as will be evident to one possessing ordinary skill.

Figure 11:
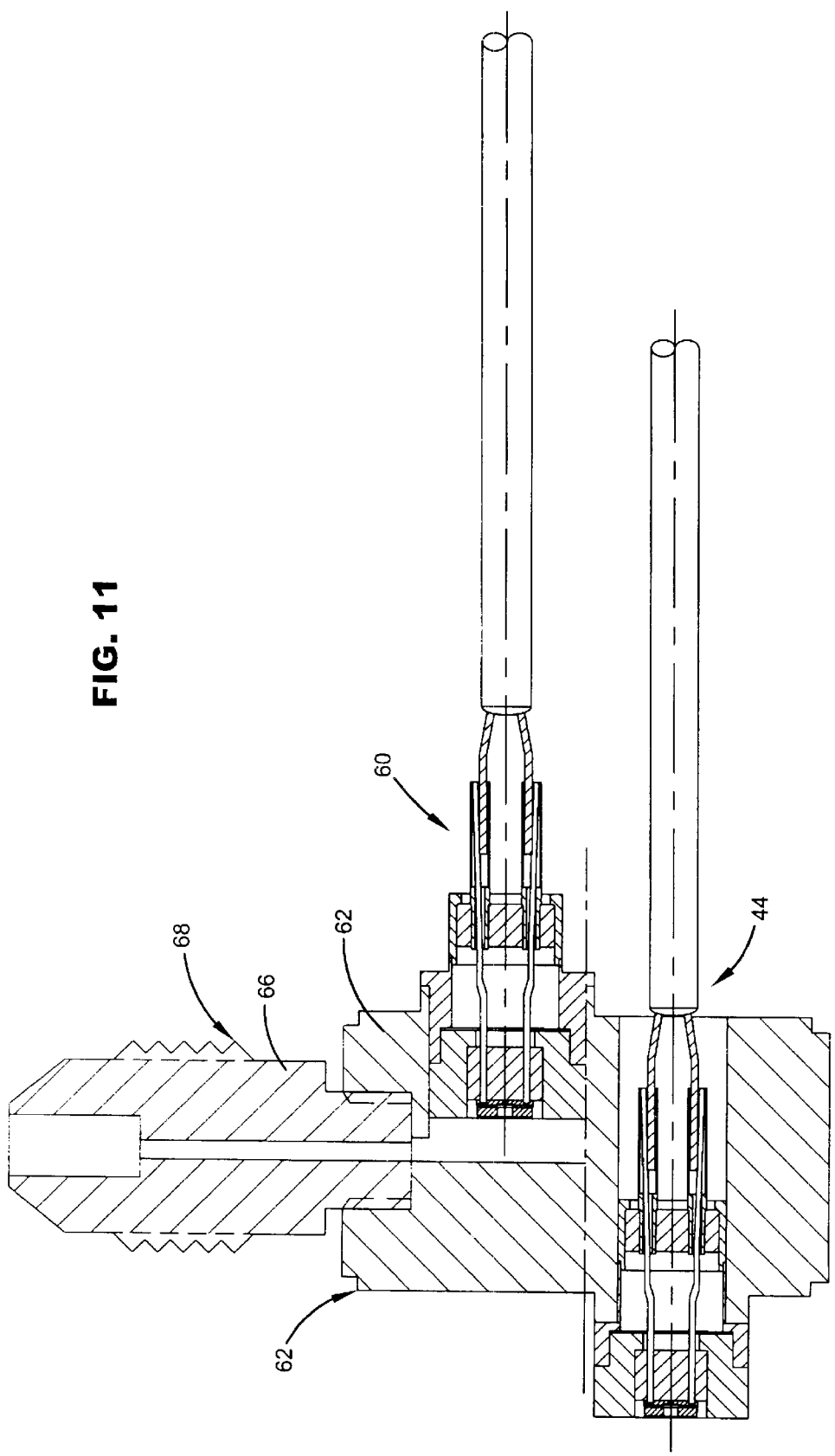
FIG. 11 illustrates the assembly of FIG. 9 further including the main header assembly of FIG. 5A.

Referring now to FIG. 11, again, the main mineral insulated cable assembly 44 is also installable into a housing 62 including a port 66 in substantially the same manner as has been set forth regarding the assembly of FIG. 10.

Figure 12:
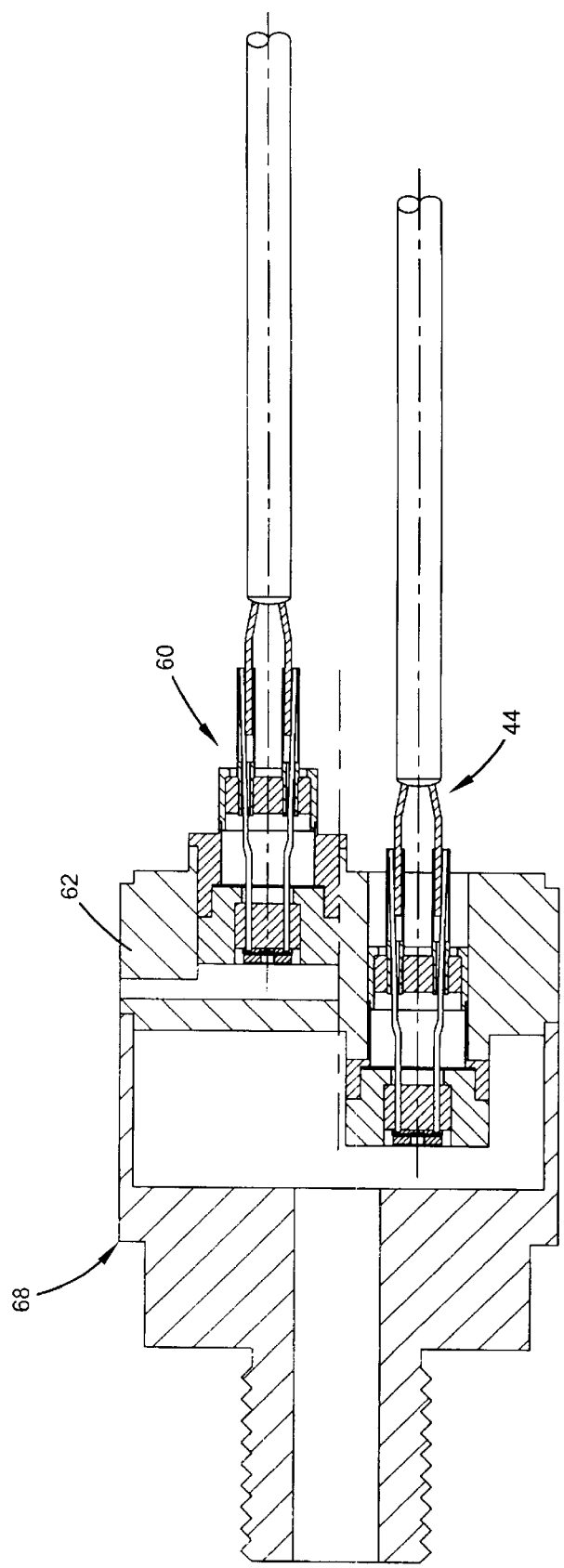
FIG. 12 illustrates the assembly of FIG. 10 mounted to a main port according to the present invention.
Figure 13:
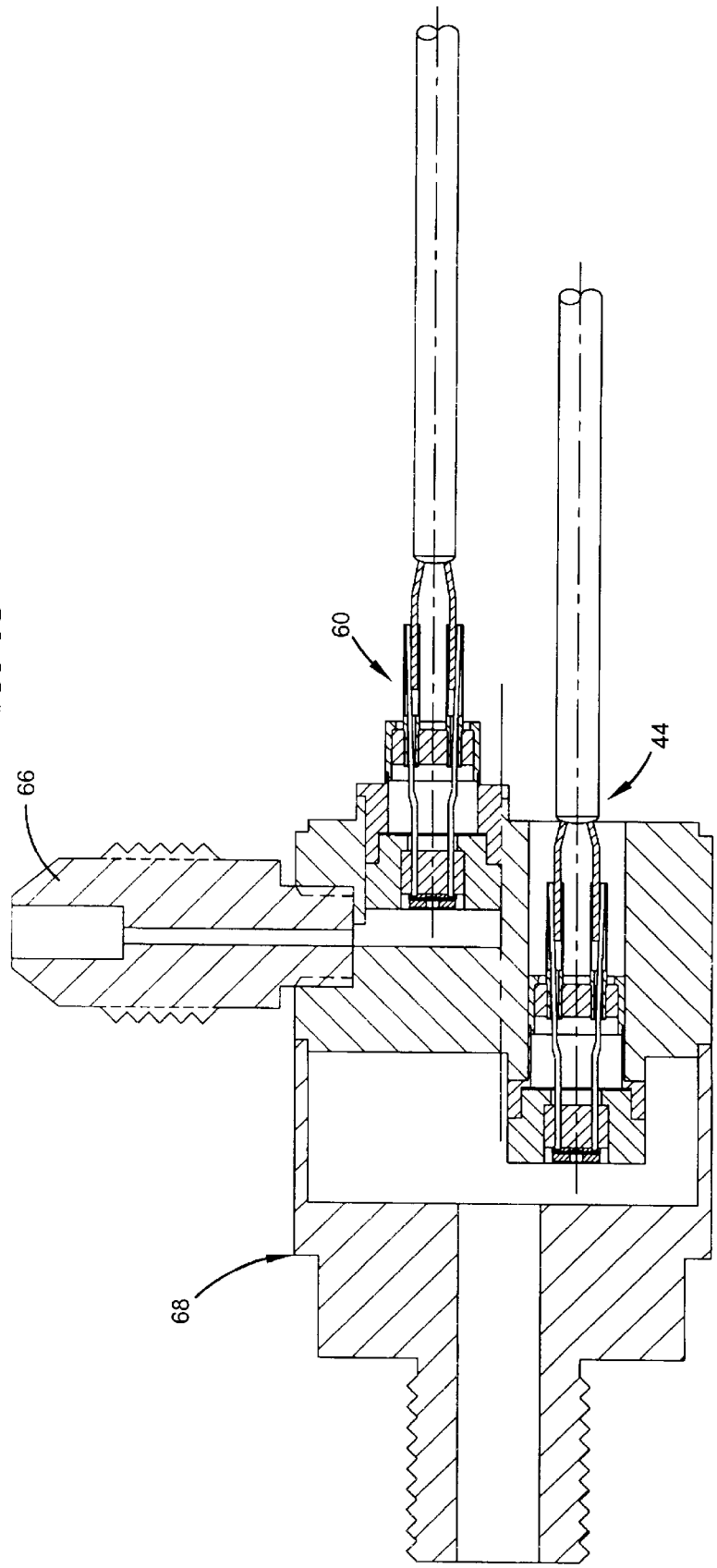
FIG. 13 illustrates the assembly of FIG. 11 mounted to a main port according to the present invention.

Referring now to FIGS. 12 and 13, the housing 62 to which header assemblies 44 and 60 have been coupled is then preferably welded to another port 68 through which the media to be measured is communicable therewith.

Figure 14:
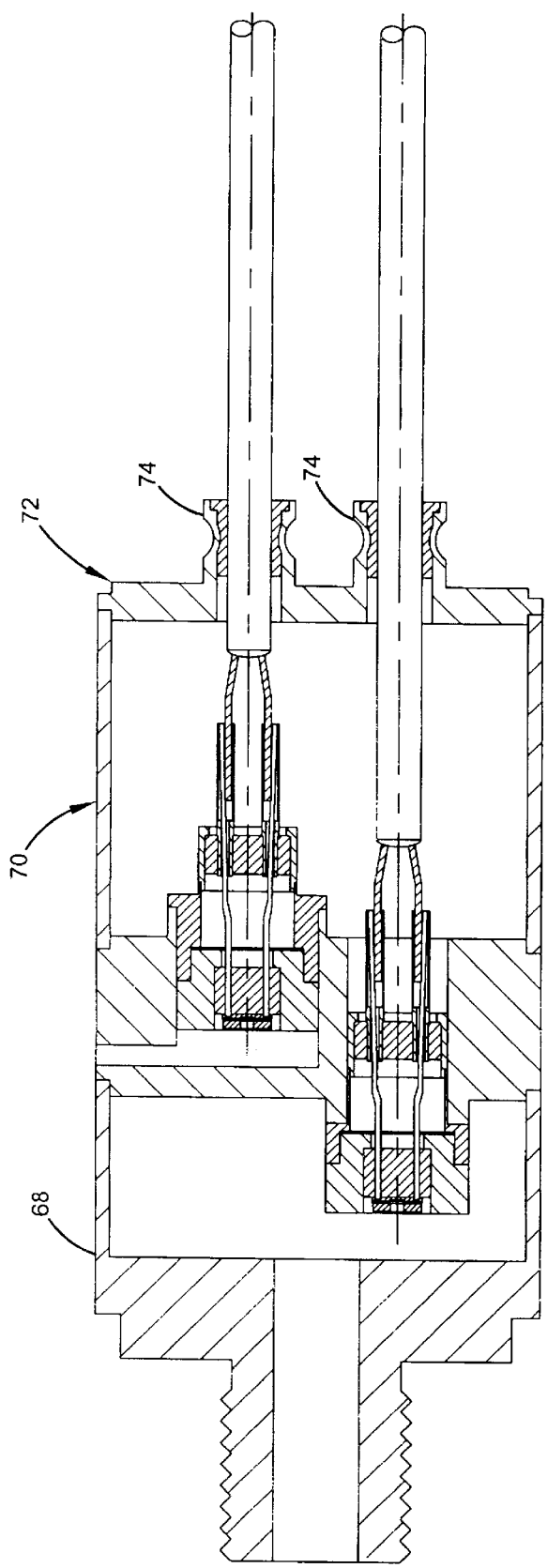
FIG. 14 illustrates the assembly of claim 12 further including a cable relief assembly according to the present invention.
Figure 15:
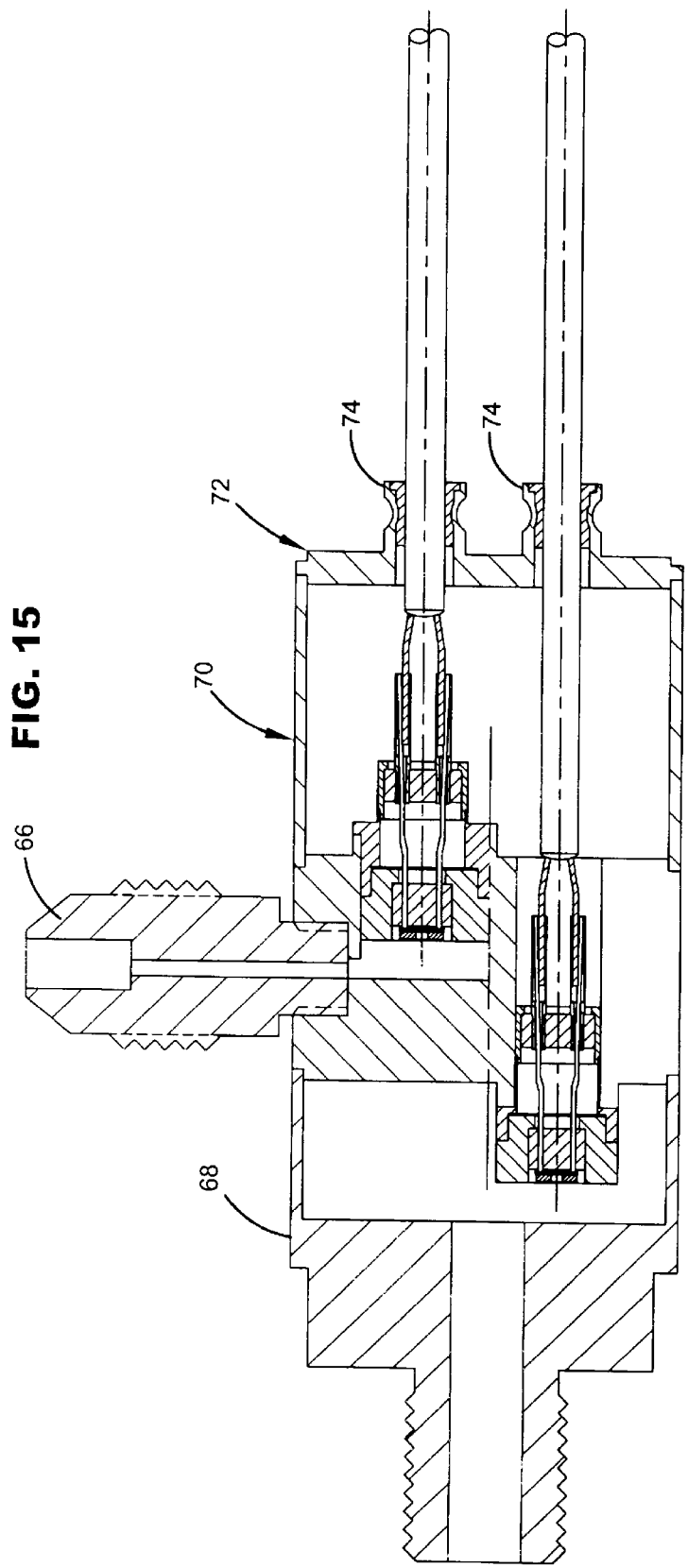
FIG. 15 illustrates the assembly of claim 13 further including a cable relief assembly according to the present invention.

Referring now also to FIGS. 14 and 15, therein is respectively illustrated the assemblies of FIGS. 12 and 13 further including a sleeve 70 welded to the housing 62 and a cable relief 72 in turn welded to the sleeve 70. The cable relief 72 includes portions 74 having apertures through which each mineral insulated cable 38 may respectively pass (again, preferably four). Each portion 74 is also crimped over the mineral insulated cable 38 to further secure it thereto.

Figure 16:
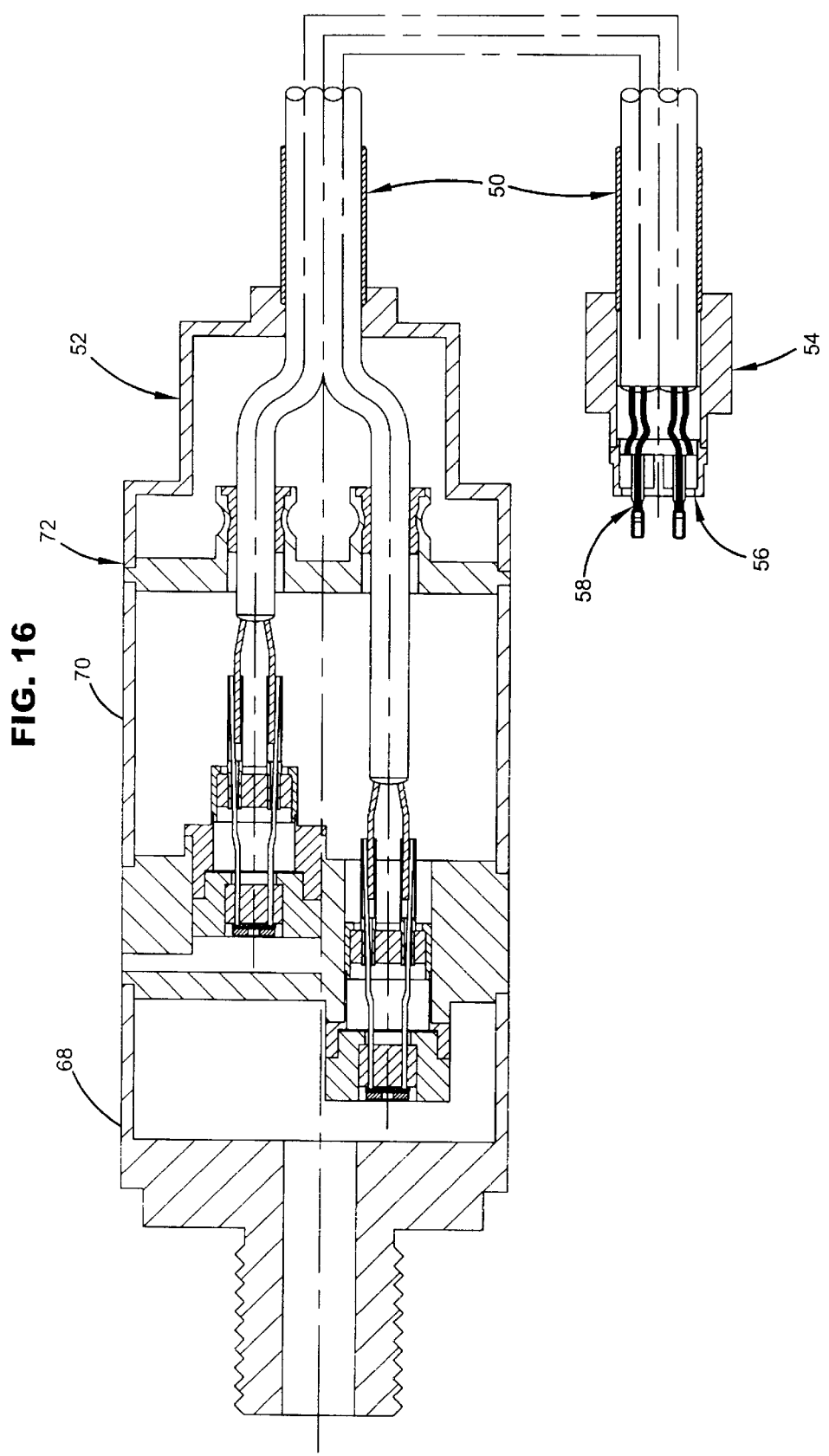
FIG. 16 illustrates a final differential, vented transducer assembly according to the present invention.
Figure 17:
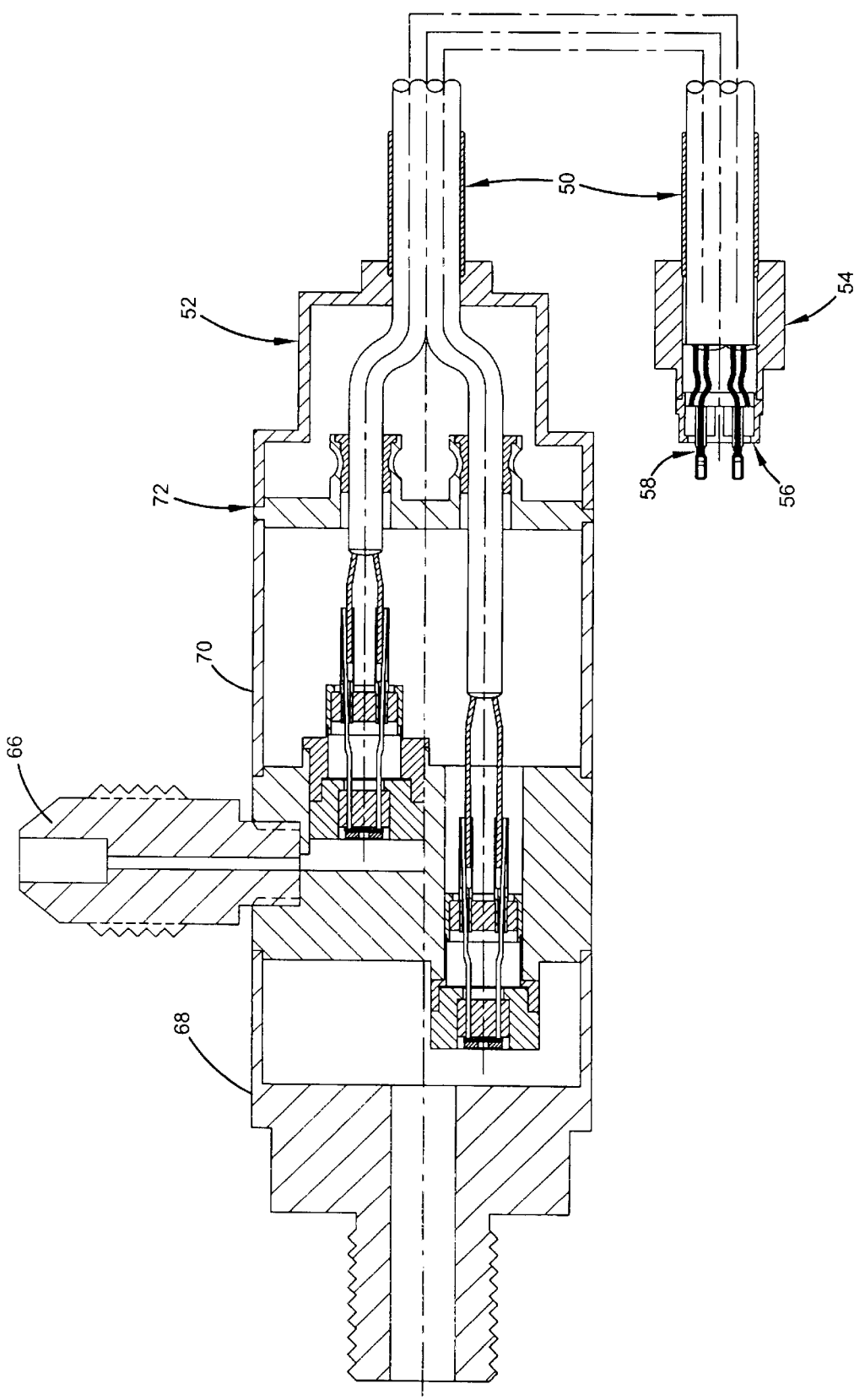
FIG. 17 a final differential, ported transducer assembly according to the present invention.

Finally referring to FIGS. 16 and 17, therein are respectively illustrated a final differential, or gauge, sensor and a ported gauge sensor according to the present invention. Again, an additional thin-walled sleeve 50 is brazed, or otherwise fastened, to at each end cylindrical portions 52, 54 having weld preparations. This sleeve 50 is installed over the insulated cable and one end is welded to the cable relief 72. A third header 56, which includes closed-ended tubes 58, is installed over the back end of the mineral insulated cable 38 such that the wires 40 within the cable 38 are inserted into the closed-ended tubes 58. These tubes 58 are then preferably crimped and spot-welded thus securing the wires 38 therein and the third header 56 is welded to the sleeve 50. Thus all of the advantages of the absolute sensor of FIG. 7 can be retained in the manufacture of a differential, or gauge sensor according to the present invention.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A pressure transducer assembly comprising:
   a reverse mounted dielectrically isolated semiconductor cup-shaped member including a thicker outside non-deflecting region and a thinner inside deflecting portion region for deflecting under pressure, at least one piezoresistive element affixed to but electrically isolated from the deflecting portion, said at least one piezoresistive element being on a surface of the member isolated from a media associated with said pressure, and a series of electrical contact areas on the non-deflecting region;
   a structure hermetically sealed to the member, and including a series of apertures aligned with said contact areas, said apertures being filled with a glass-metal frit, said member and said structure forming a composite structure;
   a glass header including at least one first lead, the glass header coupled to said composite structure including said member and said structure such that at least one first lead makes electrical contact with the glass-metal frit of at least one of said apertures of said structure; and,
   a header joined to the glass header through an intermediary sleeve, said glass header and said header being coupled to said sleeve, said header including at least one metal tube positioned such that said at least one first lead from the glass header is directed through said at least one tube, an inside diameter of said at least one tube being sufficiently large to accommodate a second lead entering in an opposite direction from said at least one first lead and having a wall thickness sufficiently thin so as to allow crimping when the said at least one first lead from the glass header and the second lead have been inserted there into to insure proper electrical contact is made between said at least one first lead and said second lead.

2. The assembly of claim 1, further comprising a port coupled to said second header.

3. The assembly of claim 2, further comprising:
   a first extension portion coupled to said port; and,
   a second sleeve coupled to said first extension portion;
   wherein said other lead is part of a thermally insulated cable partially encapsulated by said port and said second sleeve.

4. The assembly of claim 3, further comprising a second extension portion coupled to said second sleeve such that said thermally insulated cable passes thereinto.

5. The assembly of claim 4, further comprising a third header coupled to said second extension portion and including at least a second tube having a closed end and electrically coupled to said at least one lead.

6. The assembly of claim 5, wherein said thermally insulated cable is a mineral insulated cable.

7. A hermetically sealed high temperature pressure transducer assembly comprising:
   a sensor wafer including a first surface for receiving a pressure to be measured and a second surface;
   a plurality of sensor structures and contact areas selectively interconnected and formed on said second surface of said sensor wafer;
   a first header assembly coupled to said sensor wafer such that said second surface of said sensor wafer is isolated from a media associated with said pressure to be measured and including a plurality of pins each respectively electrically coupled to an associated one of said contact areas;
   a second header assembly including a plurality of tubes and coupled to said first header such that each of said pins is positioned in an associated one of said tubes;
   a sleeve coupled to said second header assembly;
   a temperature insulated cable partially positioned within said sleeve and including a plurality of wires each coupled to an associated one of said pins within said associated one of said tubes; and,
   a third header assembly coupled to said sleeve and including a plurality of closed-ended tubes adapted to serve as leads for said plurality of sensor structures, wherein each of said plurality of wires is partially positioned in and coupled to an associated one of said plurality of closed-ended tubes.

8. A high temperature pressure transducer assembly comprising:
   a sensor wafer including a first surface for receiving a pressure to be measured and a second surface;
   a plurality of sensor structures and contact areas selectively interconnected and formed on said second surface of said sensor wafer;
   a first header assembly coupled to said sensor wafer such that said second surface of said sensor wafer is isolated from a media associated with said pressure to be measured, said first header assembly including a plurality of pins each respectively electrically coupled to an associated one of said contact areas; and,
   a second header assembly including a plurality of tubes and coupled to said first header assembly such that each of said pins is positioned in a respectively associated one of said plurality of tubes.

9. The assembly of claim 8, further comprising:
   a sleeve coupled to said second header assembly; and,
   a temperature insulated cable at least partially positioned within said sleeve and including a plurality of wires each coupled to an associated one of said pins within said associated one of said tubes.

10. The assembly of claim 9, further comprising a third header assembly coupled to said sleeve and including a plurality of closed-ended tubes for serving as leads for said plurality of sensor structures, wherein each of said plurality of wires is partially positioned in and coupled to a respectively associated one of said plurality of closed-end tubes.

* * * * *